June 26, 1956
E. R. SABEL ET AL
2,752,443
SIGNALLING DEVICE FOR PHOTOCOPY MACHINE
Filed Dec. 12, 1952
2 Sheets-Sheet 1
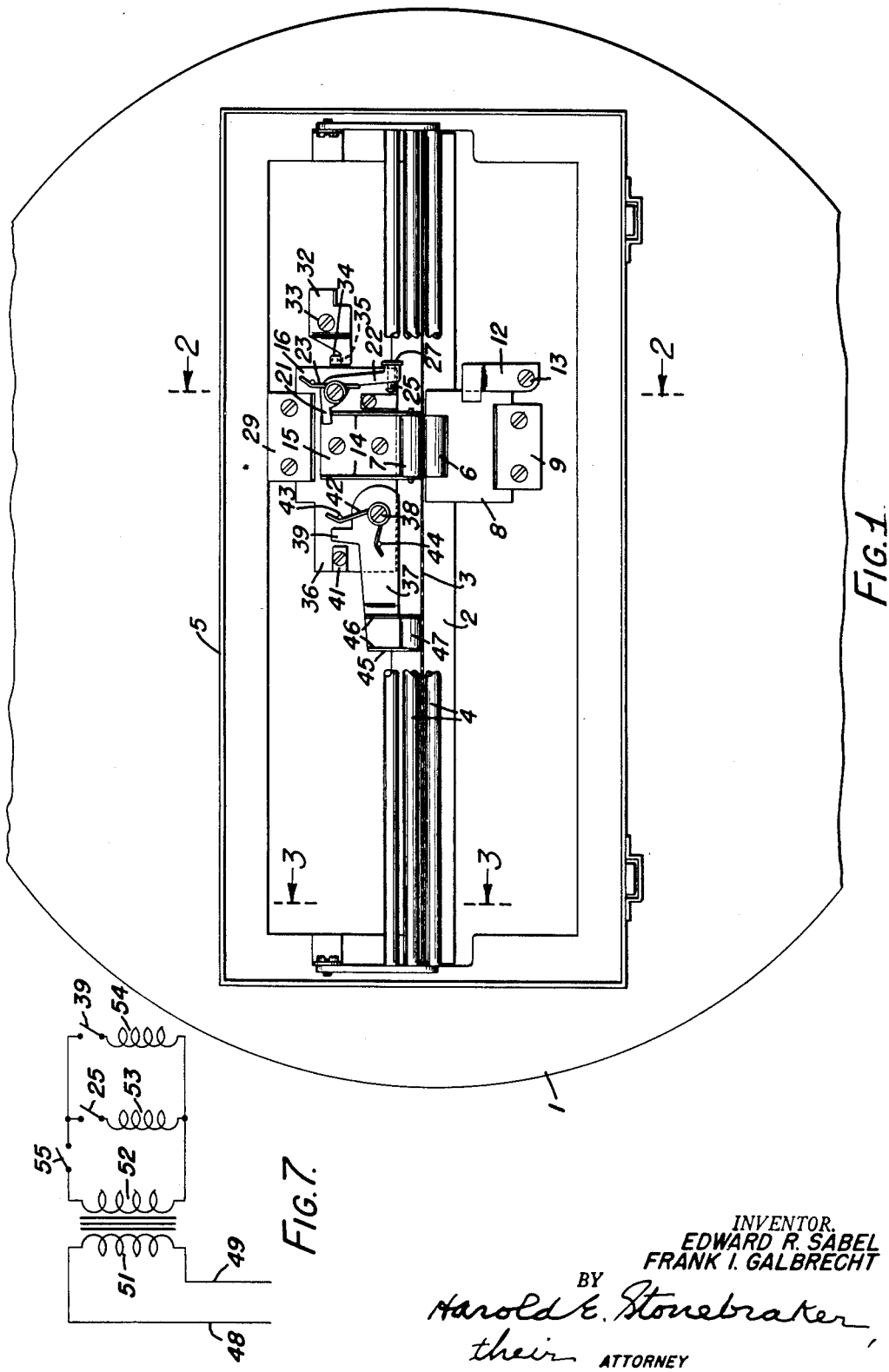
INVENTOR.
EDWARD R. SABEL
FRANK I. GALBRECHT
BY
Harold E. Stonebraker
their ATTORNEY

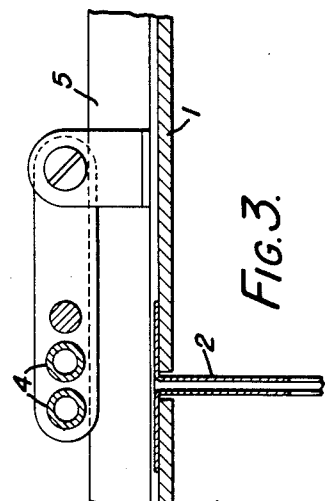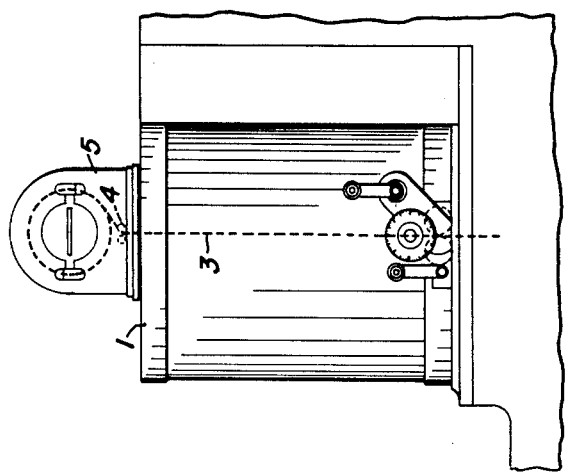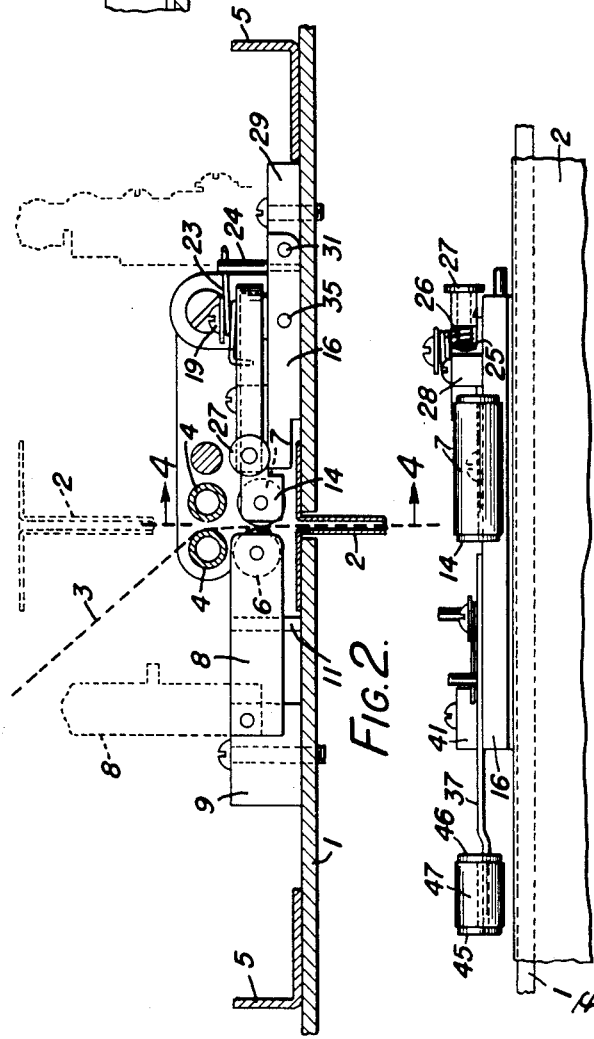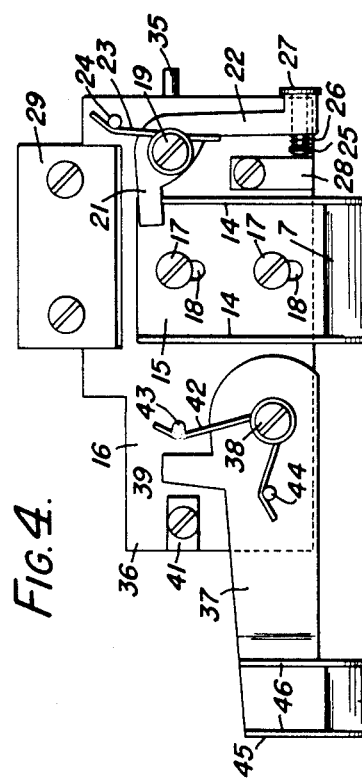

United States Patent Office 2,752,443
Patented June 26, 1956

2,752,443

SIGNALLING DEVICE FOR PHOTOCOPY MACHINE

Edward R. Sabel and Frank I. Galbrecht, Rochester, N. Y., assignors to The Haloid Company, Rochester, N. Y., a corporation of New York Application December 12, 1952, Serial No. 325,600

11 Claims. (Cl. 200—61.14)

This invention relates to a signalling device for photocopy machine, with more particular reference to photocopy and other types of cameras in which a length of film consisting of paper sensitized on one or both sides is fed continuously through the focal plane of the camera, and it has for its purpose to provide simple, efficient, and improved mechanism for signalling to the operator the approach to the focal plane of a splice or thickened portion in the film and also the end of the film in order to enable the operator to feed the spliced portion of the film manually past the focal plane or to take a second exposure in the first instance and to enable opening the magazine and inserting a fresh roll of film in the latter case.

In the manufacture of film such as employed in photocopy machines and other similar cameras, it is necessary to produce separate lengths of paper which are spliced or joined together to produce a continuous film, and it is desirable not to expose portions of the film where the splices occur. To obviate this, in some instances films have been specially prepared with slots or openings adjacent to the splices, these openings functioning to control a signal mechanism for indicating when a spliced portion of the film is approaching the focal plane, and another object of the invention is to obviate the necessity of forming slots or openings in the film and to control the signalling mechanism by the increased thickness of the film where the splice occurs.

Another object of the invention is to provide a practical and reliable mechanism of few parts that depends for its operation upon the increased thickness of the spliced portion of the film and which insures operation of the signal whenever a splice approaches the focal plane.

More particularly the invention is intended to provide mechanism including a pair of rolling elements arranged on opposite sides of the travelling film in rotating contact therewith, one of said rolling elements being relatively fixed and the other held against the film and fixed element and bodily movable as a splice passes between the rolling elements, such movement of the one rolling element being utilized to effect operation of the required signal.

Still a further purpose is to provide signalling mechanism for indicating the end of the film, or when a length of film is exhausted, and arranging the latter signal and the splice signalling mechanism in such manner that both signal-actuating mechanisms can be simultaneously and easily moved away from the focal plane when the film is exhausted and it becomes necessary to insert a fresh roll of film into the camera.

A further object of the invention is to afford simple and sturdy mechanism that functions indefinitely with certainty and accuracy, and permits varying movements of the controlling film-engaging rolling element resulting from different thicknesses of film spices without damaging or affecting the circuit-closing contact member, the latter being movably mounted on an operating arm so that after the movable contact member is engaged with its stationary contact to close the signal circuit, further movement of the operating arm is permitted in case of a splice of excessive thickness without causing additional travel of the movable contact.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view of a photocopy apparatus showing a preferred embodiment of the invention incorporated therein;

Fig. 2 is a sectional view on line 2—2 of Fig. 1 looking in the direction indicated, and showing in dotted lines the positions of the rolling element supports when adjusted away from the focal plane to permit insertion of a fresh film;

Fig. 3 is a sectional view on the line 3—3 of Fig. 1 looking in the direction indicated;

Fig. 4 is a sectional view on line 4—4 of Fig. 2, showing the relatively movable rolling element and its signalling mechanisms mounted on the movable support;

Fig. 5 is an enlarged plan view of the splice signalling mechanism;

Fig. 6 is a side elevation of the machine showing the film feeding rolls, and

Fig. 7 is a diagrammatic view of the electrical signalling circuits.

Referring more particularly to the drawings in which like reference numerals refer to the same parts throughout the several views and to Figs. 1 and 2, 1 designates the top wall of the camera housing, slotted to receive the conventional mask 2 through which the film 3 travels in the focal plane after leaving the guide rolls 4, while 5 designates the housing within which the usual film magazine is located, the upper part of the housing being broken away and the film roll not appearing as these parts form no feature of the present invention.

In order to indicate the approach of a splice or joint in the film toward the focal plane, there are provided two rolling elements preferably in the form of cylindrical rollers indicated at 6 and 7 respectively, supported for rotative movement about axes parallel to and on opposite sides of the film 3 which they engage as the latter travels downwardly.

One of the rollers is held fixed against bodily movement toward and from the film while the other roller is bodily movable toward and away from the film and held yieldably against the film so as to permit its movement away from the film when a splice, joint, or abnormally thick portion of the film passes between the rollers.

To accomplish this, the roller 6 is mounted in a support 8, see Figs. 1 and 2, that is pivotally mounted on a stationary block 9 to permit its swinging movement to a vertical inoperative position, as shown in dotted lines in Fig. 2. 11 is a pin carried on the lower side of the support 8 for engagement with the top wall 1 of the housing and acting to maintain the roller 6 in the same horizontal plane with roller 7 while 12 is a catch pivoted on a post 13 to swing about a vertical axis and engageable over the top of support 8 for holding the latter in its lowered or operative position, as shown in full lines in Figs. 1 and 2.

The roller 7 is pivotally mounted between flanges 14 of a metal plate 15 that is slidably mounted on the support 16, the plate 15 having limited movement on the support 16 toward and from the film by means of pins 17 that are fixed to the support and engage slots 18 in the plate 15. The rollers 6 and 7 rotate on opposite sides in engagement with the film as the latter travels between the rollers, the film being held against the relatively fixed roller 6 by the relatively movable roller 7 as the latter is actuated toward the film by the means that will now be described.

Mounted upon the support 16 is a signal actuating member that is pivoted upon a post 19, and includes an arm 21 that engages one of the upstanding flanges 14 of the slidable plate 15, see Fig. 1, while 22 is an electrical contact arm that operates under the conditions to be described presently to close the signal circuit. 23 designates a spring surrounding post 19, having one end engaging a pin 24 on the support 16 while its opposite end engages the arm 22 in the manner shown and thus acts to move the signal actuating member into an anti-clockwise direction, referring to Fig. 1. Thus the spring 23 actuates the arm 21, slidable plate 15 and roller 7 toward the film and relatively fixed roller 6 to maintain roller 7 in rotating engagement with the film as the latter is drawn downwardly.

Upon movement of a splice or joint or thickened portion of the film between rollers 6 and 7, roller 7 and plate 15 are moved in a direction away from roller 6, causing the signal actuating arm 22 to move to close the signal circuit, and to accomplish this, arm 22 is provided with an electrical contact 25 carried by a pin slidably mounted in an opening in arm 22 and held normally in its innermost position by a spring 26 located between the arm 22 and the contact 25, while 27 is an enlarged head at the outer end of the contact pin for limiting inward movement of the latter. The contact 25 is arranged to engage a stationary contact 28 to close the splice signalling circuit, and by arranging contact 25 yieldably on the contact arm, lost motion is permitted between the contact and the arm so that in case of a splice of excessive thickness, the contact 25 can travel until in engagement with the stationary contact 28 and further movement of the contact-carrying arm is permitted by the slidable relationship between the contact 25 and the arm. Upon return movement of the contact-carrying arm, spring 26 acts to return the contact and maintain it in normal position on the contact arm. In this manner, excessive movement of the contact or damage to any of the parts is prevented in the event of excessive thickness of a film and excessive movement of the contact-carrying arm.

The parts just described including roller 7, slidable plate 15, contact-carrying arm and stationary contact are all mounted on the support 16 which is pivoted to a stationary block 29 at 31, permitting the support 16 and the signal actuating mechanism mounted thereon to be swung upwardly to the dotted line position shown in Fig. 2, when a film is exhausted and access to the interior of the housing is desirable for positioning a mask and threading in a fresh film. The support 16 is held in its normal operative position through the instrumentality of a catch 32 pivoted on a vertical post 33 and having a locking portion 34 that engages over a pin 35 on the support 16, see Fig. 1, to hold the latter in its operative position.

The structure thus far described has to do with the signal mechanism for indicating the approach of a splice or joint in the film to the focal plane, and it is also desirable to give a signal to indicate the end of the film when exhausted. The accomplish this, signal mechanism is provided that is controlled by means mounted on the previously described pivoted support 16 so that both signal controlling mechanism can be simultaneously and easily moved to inoperative positions when desired. The support 16 includes an extension 36 on which is mounted a lever 37, pivoted on a post 38 on the extension 36, and including an electrical contact 39 arranged to engage a stationary electrical contact 41 also mounted on extension 36, while 42 is a spring surrounding the post 38 and engaging pins 43 and 44 on the extension 36 and lever 37 respectively, and acting to move the lever 37 when released to move contact 39 into engagement with contact 41 to close the signal circuit. At the end of the lever 37 is mounted a bracket 45 provided with flanges 46 between which is rotatably mounted a roller 47 that normally engages the film, as shown in Fig. 1, during the travel of the film through the focal plane of the camera, and thus holding the contacts 39 and 41 separated. When the end of the film is reached, the roller 47 is no longer held by the film and the lever 37 is released and permitted to swing in an anti-clockwise direction, referring to Fig. 1, under the impulse of spring 42 to close the signal circuit and indicate to the operator that the film is exhausted and a new supply required.

The film is fed through the machine by conventional feeding rolls and when the splice signal is operated, the operator can either stop the machine and move the film manually so as to bring the spliced portion beyond the focal plane or make a second exposure of the subject to produce a picture in a portion of the film where there is no splice, and when the film-end signal is actuated, the operator stops the machine and swings support 16 carrying both signal mechanisms to the upright position indicated in dotted lines in Fig. 2, also moving support 8 to its upright position, so that all film-engaging rollers are out of operative position and the upper part of the camera housing is exposed to permit changing a mask and threading a fresh film into the focal plane.

The approach of a splice in the film to the focal plane is indicated preferably by the ringing of a bell and the end of the feed film is signified by operation of a buzzer through the electrical circuit arrangement illustrated in Fig. 7, including 110 volt circuit conductors 48 and 49 leading to the primary coil 51 of a transformer while a secondary coil 52 of the transformer is connected with a bell signal 53 and buzzer signal 54 arranged in parallel and operated respectively by the movable contacts 25 and 39 respectively as previously described. The contacts 39 and 41 are suitably connected to opposite sides of the buzzer circuit and contacts 25 and 28 connected to opposite sides of the bell circuit, while 55 is a manual switch for opening the signal circuits when the signal mechanisms and their supports are moved to inoperative positions as in dotted lines in Fig. 2.

With this arrangement, the splice signal and film-end signal are both controlled from a single circuit by signal actuating mechanisms arranged on a common support that is pivotally arranged to move both signal actuating mechanisms either to operative or inoperative positions, and acting when in operative positions to signal both a film spline as it approaches the focal plane of the camera, and the end of the film when the latter is exhausted.

While the invention has been described with reference to the particular construction herein shown, it is not confined to the structural details set forth and this application is intended to cover such modifications or departures as may be come within the purposes of the improvements or the scope of the following claims.

We claim:

1. Mechanism for indicating the approach of a splice in a film to the focal plane of a camera comprising a pair of rolling elements between which and in contact with which the film travels, a fixed support for one of said rolling elements and a slidable plate on which the other of said rolling elements is mounted for movement toward and from the first mentioned rolling element in a direction normal to the direction of travel of the film, a flange on said slidable plate, a pivoted signal actuating member including an arm located in the path of said flange and engaged and operated by said slidable plate, and a spring connected to said pivoted signal actuating member and actuating said slidable plate toward the film.

2. Mechanism for indicating the approach of a splice in a film to the focal plane of a camera comprising a pair of rolling elements between which and in contact with which the film travels, one of said rolling elements being fixed against bodily movement and the other bodily slidable toward and from the film and fixed rolling element in a path perpendicular to the direction of travel of the film, spring means actuating said last named rolling element toward the film, a pivoted support, a plate slidable on said support and having said movable rolling element mounted thereon, a flange on said plate, a switch pivotally mounted on said support and including an arm in the path of said flange, and a spring connected to said switch and actuating said arm toward said flange of the slidable plate.

3. Mechanism for indicating the approach of a splice in a film to the focal plane of a camera comprising a pair of rolling elements between which and in contact with which the film travels, a fixed support for one of said rolling elements and a slidable plate on which the other of said rolling elements is mounted for movement toward and from the first mentioned rolling element in a direction normal to the direction of travel of the film, a pivoted support, a slidable plate mounted on said support, flanges at opposite edges of said plate on which the movable rolling element is mounted, an actuating member including an arm in the path of one of said flanges and a contact arm, a spring yieldable contact mounted on the latter arm, a stationary contact located in the path of said yieldable contact, and a spring connected to said actuating member and operating to move said first mentioned arm toward said flange on the slidable plate and the plate toward the film.

4. Mechanism for indicating the approach of a splice in a film to the focal plane of a camera comprising a pair of rolling elements between which and in contact with which the film travels, a fixed support for one of said rolling elements and a slidable plate on which the other of said rolling elements is mounted for movement toward and from the first mentioned rolling element in a direction normal to the direction of travel of the film, a pivoted support on which said slidable plate is mounted, a flange on said plate, a pivoted actuating member including an arm in the path of and engaged by said slidable plate and a contact arm, a contact yieldably mounted on said arm, a stationary contact located in the path of said last mentioned contact, and a spring connected to said actuating member and acting to move said slidable plate and its rolling element toward the film.

5. Mechanism for indicating the approach of a splice in a film to the focal plane of a camera comprising a pair of parallel rollers between which and in contact with which the fim travels, a fixed support for one of said rollers and a slidable plate on which the other of said rollers is mounted for movement toward and from the first named roller in a direction normal to the direction of travel of the film, a support on which said slidable plate is mounted, a flange on said plate, an actuating member including an arm in the path of said flange and a contact arm, a contact member slidably mounted on said last mentioned arm, a spring controlling said contact member and holding it normally in its innermost position on said arm while permitting movement of the contact outwardly of the arm, a stationary contact located in the path of said first mentioned contact, and spring means connected to said actuating member and acting to move said slidable plate and its roller toward the film and first named roller.

6. Mechanism for indicating the approach of a splice in a film to the focal plane of a camera comprising a pair of elements between which and in contact with which the film travels, one of said elements being fixed and the other movable toward and from the film in a path perpendicular to the direction of travel of the film, spring means actuating said movable element toward the film, a switch controlled by said movable element, a pivoted support on which said movable element is mounted, said support being swingable upwardly to a position where the element is out of contact with the film, a pivoted support on which said fixed element is mounted, and a second switch on the first mentioned pivoted support including a roller arranged in the path of the fim and released by movement of the film beyond the roller.

7. Mechanism for indicating the approach of a splice in a film to the focal plane of a camera comprising a pair of rolling elements between which and in contact with which the film travels, one of said rolling elements being fixed against bodily movement and the other movable bodily toward and from the film in a path perpendicular to the direction of travel of the film, spring means actuating said movable rolling element toward the film, means controlled by said bodily movable rolling element, a pivoted support on which said bodily movable rolling element is mounted, said support being swingable upwardly to a position where the rolling element is out of contact with the film, a pivoted switch-operating lever mounted on the aforementioned pivoted support, a roller on said lever engageable with the film, spring means actuating said lever and roller toward the film, a stationary contact on said pivoted support, and a contact carried by said lever for engagement with said stationary contact when said lever and roller are released by movement of the film beyond the roller.

8. Mechanism for indicating the approach of a splice in a film to the focal plane of a camera comprising a pair of rolling elements between which and in contact with which the film travels, a fixed support for one of said rolling elements and a slidable bracket on which the other of said rolling elements is mounted for movement toward and from the first named rolling element in a direction normal to the direction of travel of the film, spring means actuating said slidable bracket toward said first named rolling element, an actuating member including an arm engaged by said slidable bracket and a contact arm, a contact mounted on said arm, a stationary contact located in the path of said first mentioned contact, a pivoted support on which said bodily movable rolling element is mounted, said support being swingable upwardly to a position where the rolling element is out of contact with the film, a pivoted switch operating lever mounted on the aforementioned support and provided with a member engageable with the film, spring means actuating said lever and member toward the film, a stationary contact on said pivoted support, and a contact carried by said lever for engagement with said stationary contact when said lever is released by movement of the film beyond said member on the lever.

9. Mechanism for indicating the approach of a splice in a film to the focal plane of a camera comprising a pair of rollers between which and in contact with which the film travels, a fixed support for one of said rollers and a slidable bracket on which the other of said rollers is mounted for movement toward and from the first named roller in a direction normal to the direction of travel of the film, an actuating member including an arm engaged by said slidable bracket and a contact arm, a contact mounted on said arm, a stationary contact located in the path of said first mentioned contact, spring means controlling said actuating member and acting to move the slidable bracket toward the film and first named roller, a pivoted support on which said slidable bracket and actuating member are mounted, a pivoted switch-operating lever mounted on the aforementioned pivoted support and carrying a roller engaging the film, a stationary contact on said support, a contact carried by said pivoted lever engaging said stationary contact, and spring means actuating said lever and roller toward the film, said support being swingable upwardly to a position in which the rollers are out of engagement with the film, and an upwardly swingable pivoted support on which said relatively fixed roller is mounted.

10. Mechanism for indicating the approach of a splice in a film to the focal plane of a camera comprising a pair of rolling elements between which and in contact with which the film travels, one of said rolling elements being relatively fixed and the other slidable bodily toward and from the film in a path perpendicular to the direction of travel of the film, a support, a slidable plate mounted on said support, flanges along opposite edges of said slidable plate, a firm engaging roller mounted on said flanges, a signal actuating member pivoted upon said support, an arm on the signal actuating member located in the path of one of said flanges and an electrical contact arm on the signal actuating member, and a spring connected to the signal actuating member and operating the first mentioned arm toward said flange of the slidable plate and the plate toward the film.

11. Mechanism for indicating the approach of a splice in a film to the focal plane of a camera comprising a pair of rolling elements between which and in contact with which the film travels, one of said rolling elements being relatively fixed and the other slidable bodily toward and from the film in a path perpendicular to the direction of travel of the film, a pivoted support, said support being swingable upwardly to a position where its rolling elements are out of contact with the film, a slidable plate mounted on said support, flanges along opposite edges of said slidable plate, a film engaging roller mounted on said flanges, a signal actuating member pivoted upon said support, an arm on the signal actuating member located in the path of one of said flanges and an electrical contact arm on the signal actuating member, a spring connected to the signal actuating member and operating the first mentioned arm toward said flange of the slidable plate and the plate toward the film, a pivoted switch operating lever mounted on said support and carrying a roller engaging the film, a stationary contact on said support, a contact carried by said pivoted lever engaging said stationary contact, and spring means connected to said lever and actuating said roller toward the film when the lever is released by movement of the film beyond the lever.

References Cited in the file of this patent
UNITED STATES PATENTS

| | | |
|---|---|---|
| 1,012,379 | Longden | Dec. 19, 1911 |
| 2,104,952 | Saelens et al. | Jan. 11, 1938 |
| 2,109,373 | Landrock | Feb. 22, 1938 |
| 2,179,517 | Pelosi | Nov. 14, 1939 |
| 2,222,666 | Jacobson et al. | Nov. 26, 1940 |
| 2,523,184 | Beall | Sept. 19, 1950 |
| 2,636,951 | Fahringer | Apr. 28, 1953 |
| 2,636,952 | Fahringer | Apr. 28, 1953 |
| 2,685,626 | Zwack | Aug. 3, 1954 |